No. 738,905. Patented September 15, 1903.

UNITED STATES PATENT OFFICE.

MAX HÖNIG, OF BRÜNN, AUSTRIA-HUNGARY.

PROCESS OF EXTRACTING TANNIN.

SPECIFICATION forming part of Letters Patent No. 738,905, dated September 15, 1903.

Application filed April 18, 1903. Serial No. 153,316. (No specimens.)

*To all whom it may concern:*

Be it known that I, MAX HÖNIG, a subject of the Emperor of Austria-Hungary, residing at Brünn, in the Province of Moravia, in the Empire of Austria-Hungary, have invented certain new and useful Improvements in Processes of Extracting Tannin; and I do hereby declare the following to be a full, clear, and exact description of the invention, such as will enable others skilled in the art to which it appertains to make and use the same.

This invention relates to a process for the utilization of the waste sulfite liquors obtained in the manufacture of cellulose pulp, said process consisting in that the hot liquors exhausted from the digesters are employed direct for the lixiviation of or the extraction of tannic substances from raw materials rich in such substances—such as, for instance, quebracho-wood, oak-wood, chestnut-wood, valonia, galls, &c. This process renders it possible to utilize the quantity of heat contained in the hot liquors for the purpose of promoting the lixiviating process, and besides it enables to employ the quantity of free and combined sulfurous acid contained in the liquors for decolorizing the extracts which are to be produced. Besides, the organic substances (tannic and non-tannic substances) contained in the sulfite liquors are caused to improve the process of the production of the tannic extracts by regulating in these extracts the quantitative relation between the tannin and the acid-forming organic non-tannic substances within the limits appropriate for practical purposes.

For the practical carrying out of the process forming the subject-matter of this invention the material rich in tannin which is to be treated—such as the wood, fruit, bark, &c.—is submitted to a systematic lixiviation by means of the waste sulfite liquors exhausted from the digesters and in a still hot condition. This can be effected, by way of example, in a leaching-battery made of wood. For the purpose of utilizing the sulfurous acid introduced with the waste sulfite liquors the solutions obtained from the said operation are treated with zinc-dust and sulfuric acid or some other strong acid while being constantly agitated, according to the process described in the specification to the United States patent application, filed November 5, 1901, Serial No. 81,253, whereby an energetic decolorization of the tannic extracts is obtained without any injurious effect to the tannin itself. After the decolorization has been effected the said solutions are evaporated *in vacuo* in the usual manner, so as to bring them to a density of about 28° Baumé, and in this condition they are appropriate to be used as tannic extracts without any further treatment.

I claim—

1. The process of extracting tannin from tannin-bearing substances, which consists in leaching out the tannin from the tannin-bearing substance with a hot sulfite lye such as obtained in the manufacture of cellulose by the sulfite process, for the purpose set forth.

2. The process of extracting tannin from tannin-bearing substances and recovering the tannin in the waste sulfite lyes resulting from the manufacture of cellulose by the sulfite process, which consists in subjecting the tannin-bearing substance to the action of the hot lye as it comes from the digester and then treating the solution with zinc and with an acid capable of liberating the combined sulfurous and acetic acids, for the purpose set forth.

In testimony that I claim the foregoing as my invention I have signed my name in presence of two subscribing witnesses.

MAX HÖNIG.

Witnesses:
ALVESTO S. HOGUE,
AUGUST FUGGER.